Patented Aug. 9, 1949

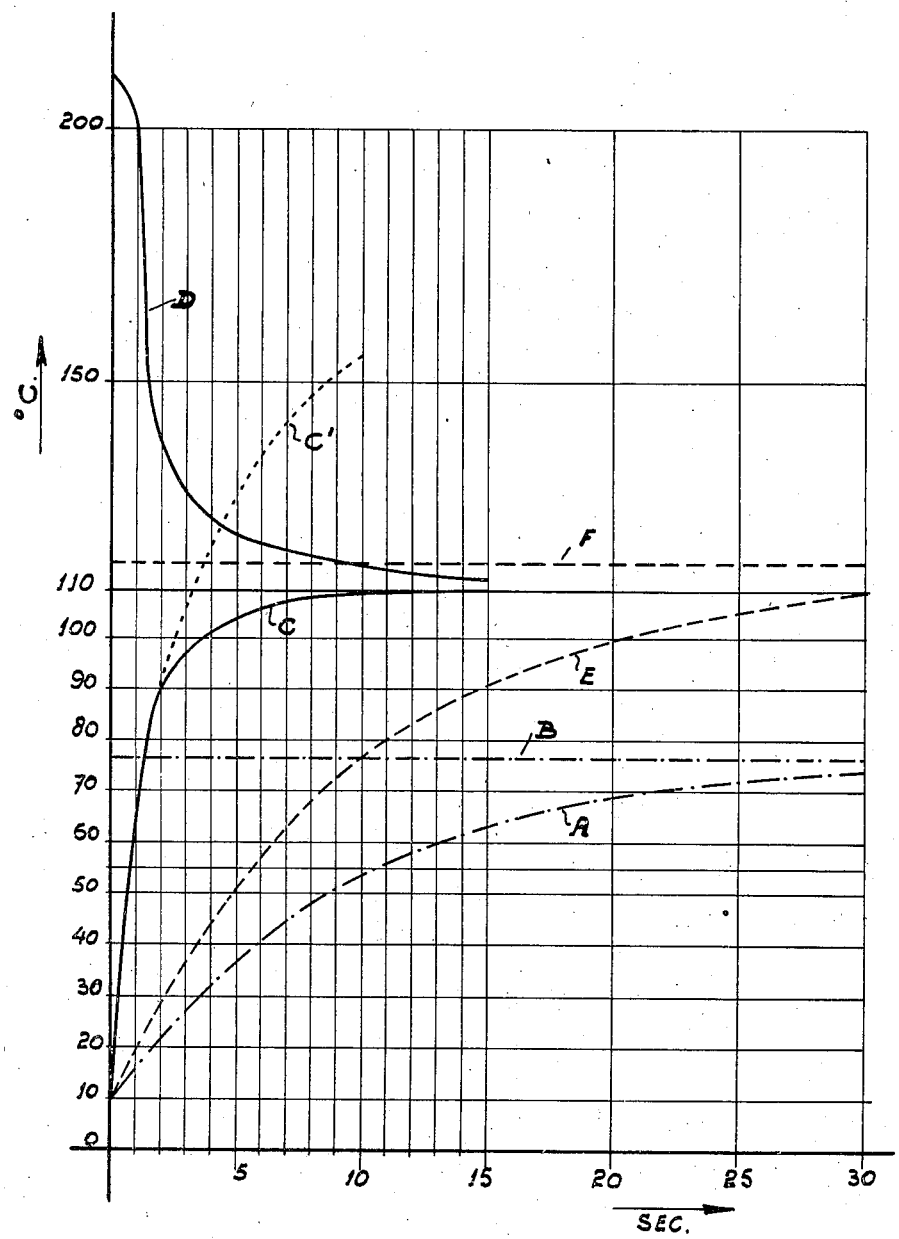

2,478,748

UNITED STATES PATENT OFFICE 2,478,748

HEAT TREATMENT OF LIQUID FOODSTUFFS

Johannes de Boer, Rotterdam, Netherlands, assignor to Commercieele Bank N. V., The Hague, Netherlands, a Dutch company Application March 26, 1946, Serial No. 657,214
In the Netherlands June 22, 1944

Section 1, Public Law 690, August 8, 1946
Patent expires June 22, 1964

1 Claim. (Cl. 99—211)

My present invention relates to a process for the preparation and treatment of durable liquid foodstuffs, tenable without refrigeration or other special measures. One object of the invention is to provide a process of this general type yielding a final product having wholly or at least mainly the same properties with regard to taste, smell, colour and flavour, and above all nutritive value, as the original natural product, of course the only undesirable property of the natural product, the contaminability, being excepted.

Various processes for the manufacture of canned foods are known already in which various components determining the nutritive value are partly or wholly unchanged. Up to some years ago, however, the existence and characteristics of other components such as vitamins were hardly or not known, so that maintenance thereof was disregarded. Only recently have preserving methods been developed in which the vitamins are at least partly maintained.

Another object of the invention is to provide a process in which special attention is directed to the maintenance of these substances and more particularly of vitamin C or ascorbic acid, this being particularly sensitive to the destructive influences of the usual conserving methods.

From the aforegoing it follows that the invention is particularly concerned with a method for the preservation of vegetable juices, e. g. fruit juices which must be considered to be the most important sources of vitamin C supply. Nevertheless, the process according to the invention also offers considerable advantages in the treatmen of other liquid foodstuffs such as milk and milk products, and hence the invention must not be considered to be limited to the treatment of vegetable juices only.

It is an established fact that ascorbic acid is very easily oxidized; so long as this oxidation takes place only partly, for instance to the reversibly reducible dehydro-ascorbic acid, little or no harm has been done to the nutritive value of the product. When oxidation proceeds, however, the process becomes irreversible and 2,3 diketo-1-gulon acid is formed, which cannot be reduced to vitamin C and which is of no nutritive value.

The oxidative processes set forth are illustrated in the following formulae:

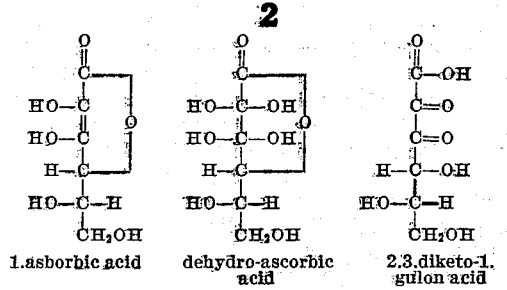

1.ascorbic acid / dehydro-ascorbic acid / 2,3 diketo-1, gulon acid

Now it has been found that milk and vegetable juices, and more particularly fruits (by which name hereinafter also tomatoes will be designated) and their juices contain free oxygen in the intercellular spaces, and moreover enzymes which promote oxidation, and are therefore called oxidases; they have the detrimental property of contributing to the destruction of vitamin C. This means that the ascorbic acid- and/or dehydro-ascorbic acid content of milk and vegetable products such as fruit and fruit-juices must drop, when kept in storage and also when being treated, a fact heretofore recognized.

A further object of my invention therefore consists in inactivating the oxidases (and also other enzymes, which means an additional advantage) present in the natural product as rapidly as possible. With this object in view my improved method includes the step of passing the liquid to be preserved continuously through an externally heated conduit, the first part of said conduit being heated more intensively than the part being passed during further treatment of the liquid. It has been found that the activity of the oxidases increases at increasing temperatures up to a certain maximum, but, when a certain critical temperature is exceeded, the oxidases are permanently inactivated or destroyed. Thus, my invention is based on the recognition that the only way to neutralise the destructive influence of oxidases on the vitamin C content in the final product consists in heating the product to at least the critical temperature for the oxidases, that in doing so the product must be passed through a temperature range in which the activity of the oxidases is increased, and that this temperature range must be passed as rapidly as possible.

Apart from protecting the ascorbic acid and dehydro-ascorbic acid, inactivating the oxidases according to the invention offers the auxiliary advantage of preventing various changes in taste and quality materializing during storage of food preserved by any other method; it has been recognized that such changes in taste and quality are mostly caused by oxidation.

According to a preferred embodiment of my invention, inactivating the oxidases is effected within a couple of seconds, and it is obvious that in order to obtain such a rapid heating the wall of the first part of the conduit must be heated to a temperature considerably higher than that which is finally to be reached by the liquid; in fact only in this way can a sufficient transfer of heat in so short a time be obtained. This high temperature of the conduit-wall, however, involves risk, for there are good chances that some particles of the liquid under treatment will be heated well above the desired temperature, resulting in all detrimental consequences inherent therein, such as changes in taste, colour, smell, and in some cases nutritive value and digestibility of the product. Therefore, an essential further feature of the present invention consists in the step of creating immediately in the first part of the conduit turbulences of such an intensity that superheating of some particles of the liquid is prevented. For this purpose according to my invention I pass the liquid through the conduit at a velocity exceeding the critical velocity for the given conduit and the given liquid. This implies that the liquid does not flow through the conduit in mutually parallel layers but, on the contrary, in a turbulent flow.

It has been proposed to create turbulences in a current of liquid in order to prevent partial superheating. It is old in the art, for instance, to arrange a coil in the annular space between two tubes, the liquid flowing through the said annular space. Apart from the fact that it is questionable whether in this way turbulences will be created in the liquid flowing in a coil-shaped path, this construction has the drawback that the apparatus is much more difficult to clean than that which I may use for carrying into effect my present invention; for this purpose I may use a normal tubular heater comprising tubes having a smooth inner surface, although the invention is not limited thereto.

Heretofore it has also been proposed to create turbulences in the current of a liquid flowing through a heater comprising a number of tubes accommodated in one steam jacket, said tubes being subsequently passed by the liquid, by providing mixing chambers between two consecutive tubes. This method, however, is insufficient for the object of the present invention, for thereby superheating in each tube separately, and particularly in the first tube, is not prevented. Of course, the invention is not limited to the omission of such mixing chambers; these may be additionally provided without departing from the spirit of the invention.

Although the present invention may be carried into effect both in any known pasteurizer or sterilizer of the plate type and in a tubular heater old in the art, I prefer the latter course, inasmuch as the temperature gradient may be readily controlled and the determination of the critical velocity is simplified. With regard to tubes having a circular cross-section the critical velocity can be calculated for each specific case in a known way. The critical velocity increases with the ratio of viscosity to density of the liquid, with increasing smoothness of the tube-wall surface, and with decreasing tube-diameter.

In order to reduce as much as possible the deposit on the inner surface of the tube, this surface is made as smooth as possible; moreover, in order to promote a rapid penetration of heat the diameter of the tube should be relatively small; this implies that two steps are taken which necessitate increase of velocity, inasmuch as by these steps the critical velocity is increased.

In order that my invention will be easily understood, and may be readily carried into ecect by those skilled in the art, the process according to my invention will, by way of example, be described in detail as applied to fruit juices, reference being held to the accompanying drawing.

For the preservation of fruit-juices various methods are employed; the more common ones have been described for instance by J. Baumann in "das Handbuch des Süssmosters."

One of the methods decommended by this writer consists in filling the bottles, heating them to a temperature of 70° to 72° centigrade (158 to 162 degrees Fahrenheit) and taking care that the temperature is kept above 65° centigrade (149° F.) for thirty minutes. According to another method the fruit juice is continuously passed through a double walled bell and thereby heated to 72° to 75° centigrade (162 to 167° F.), and subsequently slowly cooled down. Baumann quite definitely condemns surpassing this temperature limit.

Although there is some dispute as to the question at which temperature the oxidases are permanently inactivated or destroyed, the general opinion is that heating up to 80° C. (176° F.) at least is required; hence, the drawbacks of the methods recommended by Baumann are evident: the juice is kept during a considerable time within the temperature range in which the oxidases have acquired their highest activity and it is not certain at all if a sufficiently high temperature is reached for permanently inactivating the oxidases.

In the accompanying drawing the differences between the usual methods and that according to the invention are graphically illustrated.

In the drawing, the curves A, C and E represent the temperature gradient of the liquid under treatment as a function of the duration of the treatment.

The curve A represents the temperature gradient if the liquid is heated from 10° C. to 75° C. (from 50° to 167° F.) in a tube of uniform cross-section, this tube being passed in 30 seconds. If the outer surface of the wall of the tube is kept throughout the length thereof at about a uniform temperature, for instance about the temperature represented by the straight line B, the temperature gradient of the liquid represented by curve A is defined by an exponential equation.

This curve A also represents approximately the temperature gradient when employing "Baumann's Entkeimungsglocke" inasmuch as there too the temperature of the outer wall of the bell is kept practically uniform at about 75° C. (167° F.) and the annular space between the bells is passed by the liquid to be treated in about 30 seconds.

The drawing shows that the temperature of the juice is for 10 seconds within the extremely dangerous range from 30° C. to 55° C. (86° to 131° F.), this being the range in which the oxidases have their maximum activity; thereupon the final temperature of 75° C. is reached in about 20 seconds, a temperature which may not suffice to permanently and completely inactivate the oxidases.

The curve C illustrates by way of example the temperature gradient of the fruit juice when employing the process according to the invention, whereas curve D approximately represents the temperature gradient of the outer surface of the wall of the conduit through which the liquid flows. Here the dangerous range from 30° C. to 55° C. (86° to 131° F.) is passed in about ½ second, and the limit of 80° C. (176° F.) is reached in about 1½ seconds, whereas the final temperature amounts to 110° C. (230° F.) approximately; inasmuch as a higher final temperature is chosen the duration of the treatment may be considerably reduced, for example to about 10 to 15 seconds.

Obviously a sufficiently high counter-pressure must be applied to the juice to a considerably higher pressure than atmospheric pressure in order to prevent the juice from boiling at the high temperatures acquired.

For this reason, and also because the resistance in the conduit considerably increases on surpassing the critical velocity, very high entrance-pressures are required when employing the process according to the invention.

In order to show that the disadvantages of the usual methods cannot be remedied by simply increasing the final temperature, say to 110° C. (230° F.), when heating the outer surface of the conduit wall to a uniform temperature, the temperature gradient is illustrated for such a case, for example by the curve E, whereas the straight line F approximately shows the temperature of the outer surface of the conduit wall. In this case the dangerous temperature range from 30° C. to 55° C. (86° to 131° F.) is passed in about 6 seconds, it takes about 11 seconds before the temperature of 80° C. (176° F.) is reached and the entire heat treatment lasts about 30 seconds.

Obviously the process according to the invention, illustrated by curve C is preferable in every respect for obtaining the highest possible quality of the final product.

If an equally rapid initial increase in temperature were obtained by applying a uniform temperature to the outer surface of the conduit-wall the final temperature would become much too high, as shown in curve $C^1$.

With respect to the magnitude of the velocities to be applied the following may be stated:

When treating cloudy, non-filtered juices of tomato, grape, orange, grapefruit, lemon, good results have been obtained by passing the juice at a velocity of 10 meters (about 33 ft.) per second through a tube having a smooth inner surface and a diameter of 6 millimeters (about ¼ inch); the output therefore amounted to 1000 litres an hour.

The tube was intensively heated over about 20 meters (about 66 ft.) of its length, and at this point heating was very rapidly reduced; for the next 65 meters (about 71 yards) heating was slowly decreased; at a total tube-length of 90 meters (about 99 yards) heating was entirely stopped.

The non-uniform heating of the tube may be accomplished in various ways; e. g. an electric resistance heating coil may be provided around the tube, and I may choose the pitch of the coil considerably smaller in the first part of the tube than further on; when using electric heating the entire heating zone may also be subdivided and each of the parts be provided with a separately controllable supply of current.

The tube may in a manner old in the art extend through several casings; then to the first casing steam is admitted having a considerably higher temperature than that admitted to the following casings; it is also appropriate to supply steam of very high pressure to the first casing and to create, for instance by means of a condensing-vessel, such a counter-pressure that the steam condenses in this casing, thereby delivering the greater part of its heat content in the first casing, whereby the temperature of the tube in this casing will be practically uniform; the condensate may then be used for heating the subsequent casing or casings.

Moreover a tubular heater having tubes of a smaller diameter at the beginning than at the end may be employed; thereby the heat transfer per unit of tube-length is increased. Moreover the velocity of the liquid is thereby increased; hence the transfer of heat to the liquid per unit of time is increased in two respects. Furthermore, a tube having a thin wall which increases in thickness further on either gradually or stepwise may be used.

Of course, thermometers or other temperature indicators, preferably of the self registering type, must be provided in various places of the liquid passage in order to permit intelligent control and regulation of the temperatures.

After preserving or sterilizing the liquid according to my invention, and substantially as described, the liquid must be cooled down. The easiest manner of effecting this cooling consists in connecting the heated part of the conduit to a part being externally cooled in any way known in the art, for instance by surrounding the conduit by a cooling jacket through which a cooling medium, such as water, is passed. However, cooling may also be effected after the liquid has been filled into a drum, a can, a bottle or any other container. Also a combination of both methods of cooling may be employed by cooling in two stages.

When employing the process according to the invention the liquid is not necessarily cooled very rapidly, although this course may be adopted for convenience's sake; inasmuch as the oxidases have been inactivated, it does not matter if the product is thereafter kept in the dangerous temperature range of 30° C. to 55° C. (86° to 131° F.) for a considerable time.

It has been proved, more particularly by means of comparative experiments, that when applying the process according to the invention, the ascorbic acid and dehydro-ascorbic acid content of the sterilised, stable product was absolutely equal to that of the fresh, untreated raw material, whereas during storage of the product this content remained at the same level.

According to the invention further measures may be taken for reducing the chances of oxidation, particularly of the ascorbic acid; for instance the preservation may take place as soon as possible after the juice or the milk respectively has been obtained, in order to stop immediately the "inner" oxidation; in the case of vegetable juices the juice may be extracted and treated as soon as possible after harvesting or gathering the fruit or the vegetables.

Furthermore according to the invention the preparation and treatment may be conducted so as to exclude oxygen or oxygen compounds. Finally, it is advisable to prevent the juice or the milk respectively from coming into contact with the oxidation promoting catalysers, such as copper, silver, iron, etc. during preparation and preservation; that implies for instance, that when using a tubular heater for carrying the invention into effect, the tubes will preferably not be made of copper but of stainless steel, or the like.

I am aware of the fact that some of the above-mentioned measures are old in the art, but these refinements are particularly useful in connection with the present invention, inasmuch as the detrimental effects of omitting these steps have a relatively greater influence than when employing processes in which less care is taken to protect the ascorbic acid.

As various modifications may be made in the process herein described without departing from the scope of the invention, it is to be understood that all matter herein set forth is to be interpreted as illustrative only and not in a limiting sense. More particularly, the duration and degrees of heating are not critical; they may be increased within very broad limits and they may be decreased as far as the circumstances allow, provided a sterile product be obtained. When treating milk the final temperature will have to be chosen higher, for instance about 130 C. (266° F.) as has been proposed heretofore.

Having thus described and ascertained my said invention, and in what manner the same is to be performed, what I claim as new and desire to be secured by Letters Patent is:

A process for sterilizing edible liquids, which includes the steps of causing the liquid to flow in an elongated once through path in a stream having a cross-sectional area which is small as compared to the length of the path and at a velocity sufficient to establish turbulent flow, and rapidly heating the flowing liquid by supplying heat thereto at a varying rate rapidly decreasing in the direction of flow and sufficient to elevate its temperature to at least 55° C. in less than one second, and to at least 80° C. in not more than two seconds, and thereafter supplying heat to the liquid at a materially lower rate until the liquid acquires a temperature not less than 110° C. nor substantially higher than 130° C. and sufficient to effect permanent and complete inactivation of oxidases.

JOHANNES de BOER.

REFERENCES CITED

The following references are of record in the file of this patent:

UNITED STATES PATENTS

| Number | Name | Date |
|---|---|---|
| 2,217,261 | Stevens | Oct. 8, 1940 |
| 2,239,397 | North et al. | Apr. 22, 1941 |
| 2,270,540 | Mallory | Jan. 20, 1942 |